Sept. 25, 1956 C. N. RENNER 2,764,173
PRESSURE-RELIEF SAFETY VALVES
Filed April 21, 1952
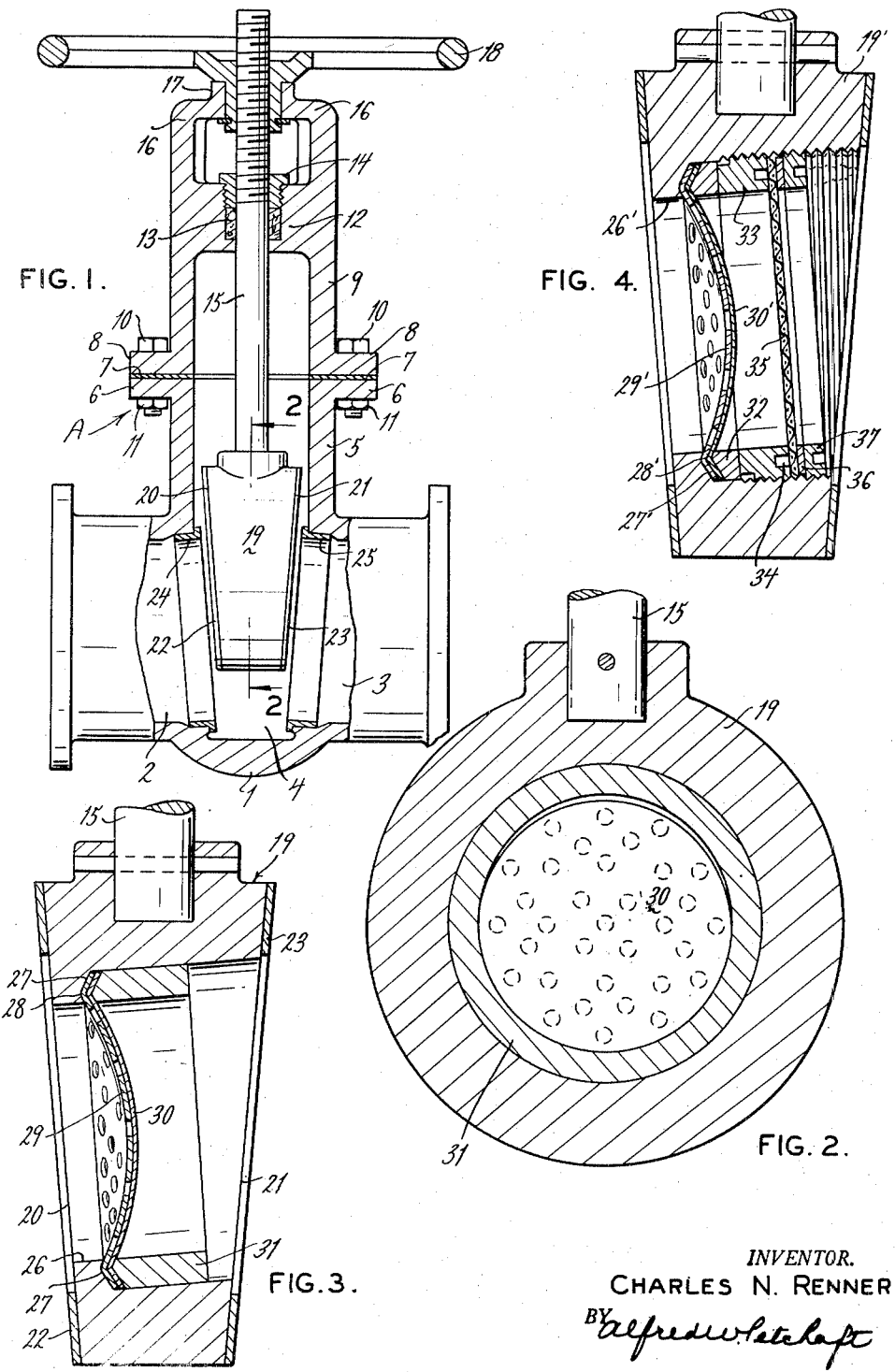
INVENTOR.
CHARLES N. RENNER
BY
ATTORNEY United States Patent Office 2,764,173
Patented Sept. 25, 1956

2,764,173

PRESSURE-RELIEF SAFETY VALVES

Charles N. Renner, Brentwood, Mo.

Application April 21, 1952, Serial No. 283,432

1 Claim. (Cl. 137—68)

This invention relates in general to certain new and useful improvements in valves and, more particularly, to pressure-relief safety valves.

In the installation of turbines and similar types of steam equipment, it is, at the present time, necessary to employ very elaborate expensive by-pass lines or similar safety equipment around the exhaust shut-off valve on the exhaust side of the turbine or steam engine, so that if, through accident or mistake of the operator, the inlet valve to the equipment is turned on, while the exhaust shut-off valve is still closed, the sudden build-up of pressure within the machine will be vented to atmosphere before it builds up to a sufficient amount to damage the machine or equipment. Since turbines, steam engines, and similar types of equipment are usually located in areas where workmen are constantly present, the safety lines must be extended upwardly through the roof of the building or exhausted to atmosphere in some manner which will render the pressure-release non-hazardous. Obviously, such arrangements are extremely expensive and are frequently of such a nature that it requires considerable time and labor to restore the machine to useful operation after such malfunctioning has occurred.

It is, hence, the primary object of the present invention to provide a valve having internal safety means capable, when the valve is closed, of venting excess pressure directly through to the conventional and already existing exhaust line whenever excessive pressure builds up behind the closed valve.

It is another object of the present invention to provide a safety valve of the type stated which is simple and economical in construction and will not leak under ordinary routine conditions of operation.

It is also an object of the present invention to provide a safety valve of the type stated which is internally provided with a rupture diaphragm or disk in such a manner that the equipment protected by the valve will be safely isolated within the pressure limits for which the diaphragm is designed when the valve is completely closed without requiring auxiliary pressure-relief valves or mechanism.

It is also an object of the present invention to provide a safety valve of the type stated having a rupture diaphragm or disk provided with a vacuum or back-pressure support so that sudden or accidental surges of excess pressure in the exhaust line will not blow back into the turbine or other equipment protected by the valve.

It is also an object of the present invention to provide a safety valve of the type stated which may be quickly and conveniently restored to normal operation after the rupture disk has been blown out as a result of excessive pressure.

With the above and other objects in view, my invention resides in the novel features of form, construction, arrangement, and combination of parts presently described and pointed out in the claim.

In the accompanying drawings—

Figure 1 is a side elevational view, partly broken away and in section, of a safety valve constructed in accordance with the present invention;

Figure 2 is a fragmentary sectional view taken along line 2—2 of Figure 1;

Figure 3 is an enlarged sectional view of the valve closure element forming a part of the present invention; and Figure 4 is an enlarged sectional view of a modified form of valve closure element embodying the present invention.

Referring now in more detail and by reference characters to the drawings, which illustrate practical embodiments of the present invention, A designates a safety valve comprising a hollow valve-body 1, which may be cast or otherwise suitably formed from brass, stainless steel, or any suitable structural material and is provided at its opposite ends with inlet and outlet ducts 2, 3, opening interiorly into a valve-chamber 4 to form, in effect, a continuous passageway through the valve-body 1. The chamber 4 opens upwardly to a gate-neck 5, which is provided with an upwardly presented flange 6 having a gasket 7 for tightly sealed engagement with the downwardly presented flange 8 of a valve-bonnet 9, secured thereto by means of bolts 10 and fastening nuts 11. The valve-bonnet 9 integrally includes a transverse end wall 12 drilled and threaded for conventionally receiving a tubular packing gland 13 and packing collar 14 for snug fitting disposition around a valve stem 15, which extends axially therethrough and is threaded along the upper or exposed portion of its length. At its upper end, the valve-bonnet 9 is provided with a plurality of outwardly extending ribs 16 integrally joined at their outer ends by a transverse collar 17, which is centrally drilled for rotatably supporting an internally threaded handle wheel 18, which is, in turn, operatively engaged with the threaded portion of the valve stem 15. At its lower end, the valve stem 15 extends through the gate-neck 5 into the valve-chamber 4 and its internal end is connected to a valve closure element or gate 19 having oppositely presented oblique faces 20, 21, respectively provided with annular seating rings 22, 23, which are, in turn, lapped to corresponding seat-forming rings 24, 25, respectively.

The valve-gate 19 is axially drilled to provide an auxiliary or blow-by passageway 26, which is counterbored from one end to provide a shoulder 27 having an annular indentation or groove 28. Seated against the indented shoulder and extending across the passageway is a foraminous concave back-pressure support plate 29 having a marginal or peripheral rim shaped to fit conformably into the groove 28. Also extending across the passageway 26 and lying snugly facewise against the back-pressure support plate 29 is a thin metal rupture-disk or diaphragm 30. The plate 29 and diaphragm 30 are held in tightly fitted or seated engagement against the shoulder 27 by means of an annular retainer ring 31, which is shrunk or otherwise suitably forced into place within the counterbored portion of the passage 26, as shown in Figure 3. It should be noted in this connection that the back-pressure support plate 29 is located on the pressure or so-called "high side" of the valve A and is bowed outwardly toward the low pressure side or outlet duct 3. Thus, when the pressure within the equipment reaches a predetermined danger level, the pressure will exert itself through the foraminous back-pressure support plate 29 against the diaphragm 30, causing the latter to rupture or blow-out and thus releasing pressure directly into the exhaust line which is conventionally connected to the outlet duct 3 of the valve A. Contrariwise, if a sudden surge of high pressure should accidentally or, for any other reason, enter the exhaust line 3 and exert itself through the duct 3 against the diaphragm 30 with a tendency to blow the diaphragm 30 backwardly toward the intake duct 2, the diaphragm 30 will be supported by the back-pressure support plate 29 and this reverse pressure will be prevented from blowing out the diaphragm 30 and exerting itself against the machinery or equipment protected by the valve A.

In the event that the rupture-disk or diaphragm 30 is blown out due to some accidental circumstance, the cause of the excess pressure may be corrected and then, as is conventional practice in all repair operation, the system shut down by closing the main valves (not shown) and venting the exhaust lines. The valve-bonnet 9 may thereupon be removed from the valve-body 1 by loosening and removing the nuts 11 and bolts 10, and the entire valve-gate structure may be lifted bodily out of the valve-body 1 and the annular ring 31 removed to permit replacement of the ruptured or blown-out diaphragm 30. This replacement operation can be quickly and conveniently performed and the valve A restored to normal operation within a matter of a very few minutes. It will, of course, be understood, in this connection, that, where desired, the back-pressure support plate can be eliminated and the diaphragm 30 used by itself.

It is also possible to provide a modified form of valve closure element or gate 19′, as shown in Figure 4, which is in all respects substantially similar to the previously described valve closure element or gate 19, having an auxiliary or blow-by passageway 26′ counterbored and provided with a shoulder 27′ having an indentation 28′ against which are seated a back-pressure support plate 29′ and rupture disk 30′. Slidably mounted within the counterbored portion of the passage 26′ is a retainer ring 32 and outwardly of the retainer ring 32, the counterbored portion of the passage 26′ is internally threaded for accommodating a locking ring 33 having a plurality of axially drilled recesses 34 for receiving a suitable turning tool of the spanner type. If desired, a circular retaining screen 35 may be seated within the counterbored portion of the passageway 26′ so that it extends across the outwardly presented face of the locking ring 33 and is held in place by a seating collar 36 and auxiliary locking ring 37, the latter also being externally threaded for engagement with the threaded portion of the passageway 26′, as shown in Figure 4.

The modified form of valve closure element or gate 19′ will function in substantially the same manner as the previously described valve closure element or gate 19. The retaining screen 35, however, will serve to insure against the accidental entrainment of sharp metallic particles in the exhaust line in case of a violent rupturing of the diaphragm 30′. In addition, the ruptured diaphragm 30′ may be replaced and the valve closure element or gate 19′ restored to normal operation very quickly and simply by successively removing the locking rings 37, the collar 36, the screen 35, the locking ring 33, the retaining ring 32, and, finally, the remnants of the ruptured disk 30′. When a new rupture disk 30′ has been installed, the retainer ring 32 can be slid into place again and locked by threading the locking ring 33 back into place. The retaining screen 35, if it is to be used, may also be replaced and secured in place by the collar 36 and auxiliary locking ring 37.

It will be evident that safety valves constructed in accordance with the present invention are simple and positive in operation and eliminate the need for full pressure relief valves or safety valves of an external nature. Furthermore, the need for expensive and cumbersome safety by-pass piping arrangements are obviated and great economies are achieved by reason of the fact that safety valves constructed in accordance with the present invention require no space not already occupied by conventional stop valves. This economy of space is particularly important where turbine installations are being made in close quarters, such as the engine-holes of seagoing vessels and in other locations where the gas or steam discharge would, of necessity, be piped through walls, decks, floors, or similar structures in order to be vented to atmosphere.

Another important and valuable aspect of safety valves constructed in accordance with the present invention resides in the fact that when the valve closure element is withdrawn, that is to say when the valve is open, the rupture disk is removed from the line of fluid or gas flow and causes no friction or pressure drop which would not ordinarily be encountered in a conventional type of valve. Furthermore, the rupture disk or diaphragm is under no stress and, hence, will not tend to develop leaks. In this connection also, it should be noted that conventional types of safety valve by-pass arrangements which employ rupture elements of some sort or another frequently require expensive and complicated external cooling systems on the outer face of the rupture disk in order to protect the rupture disk against high temperatures within the line. In the safety valve of the present invention, however, when the valve is open, both sides of the rupture disk are exposed to equal conditions of temperature and pressure, so that no abnormal stresses are set up which might cause the disk to leak or blow-out prematurely.

It should be understood that changes and modifications in the form, construction, arrangement, and combination of the several parts of the pressure-relief safety valve may be made and substituted for those herein shown and described without departing from the nature and principle of my invention.

Having thus described my invention, what I claim and desire to secure by Letters Patent is:

A gate valve comprising a body having a main passageway adapted to permit fluid-flow therethrough, a valve head mounted in the valve body for optional movement from a closure-forming position across the passageway to a position in which flow through the passageway is substantially non-interrupted, said valve head comprising a tubular bore extending entirely therethrough in the provision of a straight auxiliary passageway, open at both ends and slightly cocked with respect to said main passageway so that the longitudinal center line of the auxiliary passageway is disposed at an oblique angle to the longitudinal axis of the main passageway when the head is in closure-forming position, said bore being counterbored from one end to form a shoulder having an annular seat-forming indentation, a concave rupture disk having an outwardly turned peripheral rim shaped to fit in the indentation when the disk is disposed in closure-forming position across the auxiliary passageway for blowing out under pressure in excess of a predetermined pressure limit to permit fluid-flow through the head, a relatively rigid concave foraminous plate having a shape which matches the shape of the diaphragm mounted across said auxiliary passageway in nested facewise contact against the surface of the diaphragm, a locking ring removably mounted in the auxiliary passageway against the diaphragm, and a screen mounted across the auxiliary passageway on the opposite side of the disk with respect to the foraminous plate, said screen being in outwardly spaced relation to the disk.

References Cited in the file of this patent

UNITED STATES PATENTS

| | | |
|---|---|---|
| 540,419 | Burlingame | June 4, 1895 |
| 875,481 | Wilson | Dec. 31, 1907 |
| 1,185,333 | Keltner | May 30, 1916 |
| 1,250,680 | Sheldon | Dec. 18, 1917 |
| 1,655,433 | Morris | Jan. 10, 1928 |
| 1,912,458 | Mapes | June 6, 1933 |
| 1,959,822 | Greve | May 22, 1934 |
| 2,106,176 | Huffman et al. | Jan. 25, 1938 |
| 2,562,672 | Kunert et al. | July 31, 1951 |
| 2,608,201 | Henry | Aug. 26, 1952 |

FOREIGN PATENTS

| | | |
|---|---|---|
| 40,235 | Denmark | May 22, 1929 |